United States Patent
Van Hook

[11] Patent Number: 5,802,839
[45] Date of Patent: *Sep. 8, 1998

[54] ENDLESS POWER TRANSMISSION BELT CONSTRUCTION, CORD THEREFOR AND METHODS OF MAKING THE SAME

[75] Inventor: Robert M. Van Hook, Springfield, Mo.

[73] Assignee: Dayco Products, Inc., Dayton, Ohio

[ * ] Notice: The term of this patent shall not extend beyond the expiration date of Pat. No. 5,425,681.

[21] Appl. No.: 626,523

[22] Filed: Apr. 2, 1996

Related U.S. Application Data

[60] Continuation-in-part of Ser. No. 412,652, Mar. 28, 1995, Pat. No. 5,505,667, which is a division of Ser. No. 287,696, Aug. 9, 1994, Pat. No. 5,425,681.

[51] Int. Cl.[6] ................. D02G 3/02; D02G 3/36
[52] U.S. Cl. ................. 57/902; 57/236; 57/237; 474/263; 474/268
[58] Field of Search ................. 474/204, 205, 474/237, 263, 266, 267, 268; 57/902, 236, 237

[56] References Cited

U.S. PATENT DOCUMENTS

| | | | |
|---|---|---|---|
| 4,083,260 | 4/1978 | Carlson et al. | 74/233 |
| 4,498,891 | 2/1985 | Machimo et al. | 474/205 |
| 4,790,802 | 12/1988 | Onoe et al. | 474/260 |
| 4,832,673 | 5/1989 | Nagai et al. | 474/263 |
| 5,120,280 | 6/1992 | Mizuno et al. | 474/260 |
| 5,209,961 | 5/1993 | Yokoi | 428/161 |
| 5,230,667 | 7/1993 | Nakajima et al. | 474/263 |
| 5,425,681 | 6/1995 | Van Hook | 474/263 |
| 5,505,667 | 4/1996 | Van Hook | 474/263 |
| 5,576,105 | 11/1996 | Reinthaler et al. | 428/395 |

*Primary Examiner*—William Stryjewski
*Attorney, Agent, or Firm*—Joseph V. Tassone

[57] ABSTRACT

An endless power transmission belt construction, cord therefor and methods of making the same are provided, the cord having the yarns and the plies thereof respectively twisted on a 2 for 1 twister so as to cause the longitudinal axes of the fiber filaments to be disposed generally in the longitudinal direction of the cord with the denier of the fiber filaments of each yarn being approximately 1500. The twist multiplier of three plies is 3.7687 as the plies are twisted together at a rate of approximately 2.9 turns per linear inch of the cord, and the twist multiplier for the two yarns is 3.6765 as the two yarns for each ply are twisted together at a rate of approximately 4.9 turns per linear inch of that ply. The twist multiplier for five plies is 3.6986 as the plies are twisted together at a rate of approximately 1.8 turns per linear inch of the cord, and the twist multiplier for three yarns is 3.5838 as the three yarns for each ply are twisted together at a rate of approximately 3.9 turns per linear inch of that ply. The fiber filaments comprise p-aramid that comprises co-poly (paraphenylene/3,4'oxydiphenylene terephthalamide).

20 Claims, 2 Drawing Sheets

ENDLESS POWER TRANSMISSION BELT CONSTRUCTION, CORD THEREFOR AND METHODS OF MAKING THE SAME

CROSS REFERENCE TO RELATED APPLICATIONS

This application is a continuation-in-part of application Ser. No. 08/412,652, filed Mar. 28, 1995; now U.S. Pat. No. 5,505,667, issued Apr. 9, 1996; which in turn is a division of application Ser. No. 08/287,696, filed Aug. 9, 1994, now U.S. Pat. No. 5,425,681, issued Jun. 20, 1995.

BACKGROUND OF THE INVENTION

1. Field of the Invention

This invention relates to a new endless power transmission belt construction and to a new cord for the load-carrying section of the belt construction as well as to a new method of making such an endless power transmission belt construction and a new method of making such a cord.

2. Prior Art Statement

It is known to provide a p-aramid fiber cord for use as a component in a power transmission belt construction or the like, the cord comprising three plies twisted together in one direction at a rate to approximately equal a first certain twist multiplier with each ply comprising two yarns of a plurality of p-aramid fiber filaments having a certain denier and being twisted together in a direction opposite to the one direction at a rate to approximately equal a second certain twist multiplier, each twist multiplier being equal to the quotient of the product of the turns per linear inch of twisted material multiplied by the square root of the product of the certain denier of the fiber filaments multiplied by the total number of the yarns being twisted at that time divided by seventy-three. For example, see the Carlson et al, U.S. Pat. No. 4,083,260.

It is also known to form the cord for an endless power transmission belt construction from fiber filaments made of a p-aramid material sold under the trademark TECHNORA of the Teijin Corporation of Japan and sold in the United States by Teijin Shoji New York Inc. of New York. For example, see the Nakajima et al, U.S. Pat. No. 5,230,667.

SUMMARY OF THE INVENTION

It is one of the features of this invention to provide a new cord for an endless power transmission belt construction where in the new cord has improved characteristics over a prior made cord formed of standard p-aramid fiber filaments.

In particular, the prior made cord comprises three plies twisted together in one direction at a rate to approximately equal a first certain twist multiplier with each ply comprising two yarns of a plurality of p-aramid fiber filaments having a certain denier and being twisted together in a direction opposite to the one direction at a rate to approximately equal a second certain twist multiplier, each twist multiplier being equal to the quotient of the product of the turns per linear inch of twisted material multiplied by the square root of the product of the certain denier of the fiber filaments multiplied by the total number of the yarns being twisted at that time divided by seventy-three, the yarns and the plies being twisted together so as to cause the longitudinal axes of the fiber filaments to be disposed generally perpendicular to the longitudinal direction of the cord with the certain denier being approximately 1500, the first certain twist multiplier being created by the three plies being twisted together at a rate of approximately 4.7 turns per linear inch of the cord, the second certain twist multiplier being the result of two yarns being twisted together at a rate of approximately 4.7 turns per linear inch of that resulting ply.

However, it was found according to the teachings of this invention that instead of utilizing standard p-aramid fiber filaments as previously set forth, a technical synergy results if the fiber filaments can be formed of a modified p-aramid comprising co-poly (paraphenylene/3,4'oxidiphenylene terephthalamide) with a balanced twist multiplier and having the yarns and the plies respectively twisted on a 2 for 1 twister means so as to cause the longitudinal axes of the fiber filaments to be disposed generally in the longitudinal direction of the cord and with the denier of each yarn being approximately 1500. The first certain twist multiplier is 3.7687 when three plies are twisted together at a rate of approximately 2.9 turns per linear inch of the cord, and the second twist multiplier is 3.6765 when two yarns for each ply are twisted together at a rate of approximately 4.9 turns per linear inch of that ply. The first certain twist multiplier is 3.6986 when five plies are twisted together at the rate of approximately 1.8 turns per linear inch of cord, and the second twist multiplier is 3.5838 when three yarns for each ply are twisted together at a rate of approximately 3.9 turns per linear inch of that ply.

It was found that the resulting cord of this invention has improved break characteristics over the prior known cord formed of the standard p-aramid fiber filaments as set forth hereinafter.

Thus, this invention comprises a p-aramid fiber cord for use as a component in a power transmission belt construction or the like, the cord comprising, in a first embodiment, three plies twisted together in one direction at a rate to approximately equal a first certain twist multiplier with each ply comprising two yarns; and in a second embodiment, five plies twisted together in one direction at a rate approximately equal a different twist multiplier with each ply comprising three yarns. In both embodiments the cord is comprised of a plurality of p-aramid fiber filaments having a certain denier and being twisted together in a direction opposite to the one direction at a rate to approximately equal a second certain twist multiplier, each twist multiplier being equal to the quotient of the product of the turns per linear inch of twisted material multiplied by the square root of the product of the certain denier of the fiber filaments multiplied by the total number of the yarns being twisted at that time divided by seventy-three, the yarns and the plies being respectively twisted on a 2 for 1 twister means so as to cause the longitudinal axes of the fiber filaments to be disposed generally in the longitudinal direction of the cord with the certain denier being approximately 1500. In the first embodiment, the first certain twist multiplier is 3.7687 for the three plies twisted together at a rate of approximately 2.9 turns per linear inch of the cord, and the second certain twist multiplier is 3.6765 as the two yarns for each ply are twisted together at a rate of approximately 4.9 turns per linear inch of that ply. In the second embodiment, the first certain twist multiplier is 3.6986 for the five plies twisted together at a rate of approximately 1.8 turns per linear inch of the cord, and the second certain twist multiplier is 3.5838 as the three yarns for each ply are twisted together at a rate of approximately 3.9 turns per linear inch of that ply. The p-aramid comprising co-poly (paraphenylene/3,4'oxydiphenylene terephthalamide).

Accordingly, it is an object of this invention to provide a new cord for use as a component in a power transmission belt construction or the like, the cord of this invention having one or more of the novel features of this invention as set forth above or hereinafter shown or described.

Another object of this invention is to provide a new method of making such a cord, the method of this invention having one or more of the novel features of this invention as set forth above or hereinafter shown or described.

Another object of this invention is to provide a new power transmission belt construction utilizing such a cord, the belt construction of this invention having one or more of the novel features of this invention as set forth above or hereinafter shown or described.

Another object of this invention is to provide a new method of making such a belt construction, the method of this invention having one more of the novel features of this invention as set forth above or hereinafter shown or described.

Other objects, uses and advantages of this invention are apparent from a reading of this description which proceeds with reference to the accompanying drawings forming a par thereof and wherein:

DESCRIPTION OF THE PREFERRED EMBODIMENT

Figure 1:
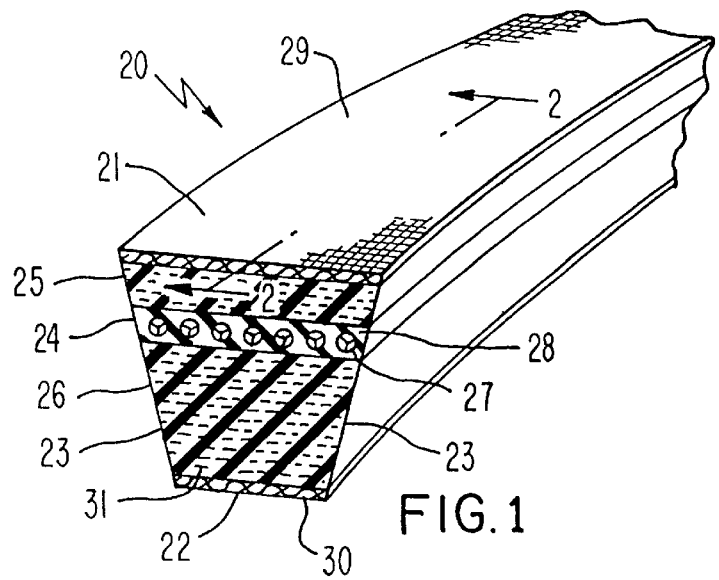
FIG. 1 is a fragmentary perspective view illustrating the new endless power transmission belt construction

While the various features of this invention are hereinafter illustrated and described as being particularly adapted to provide a cord for an endless power transmission belt construction of a particular configuration, it is to be understood that the various features of this invention can be utilized to provide a cord for other types of belt constructions or for other structures as desired.

Therefore, this invention is not to be limited to only the embodiment illustrated in the drawings, because the drawings are merely utilized to illustrate one of the wide variety of uses of this invention.

Figure 2:
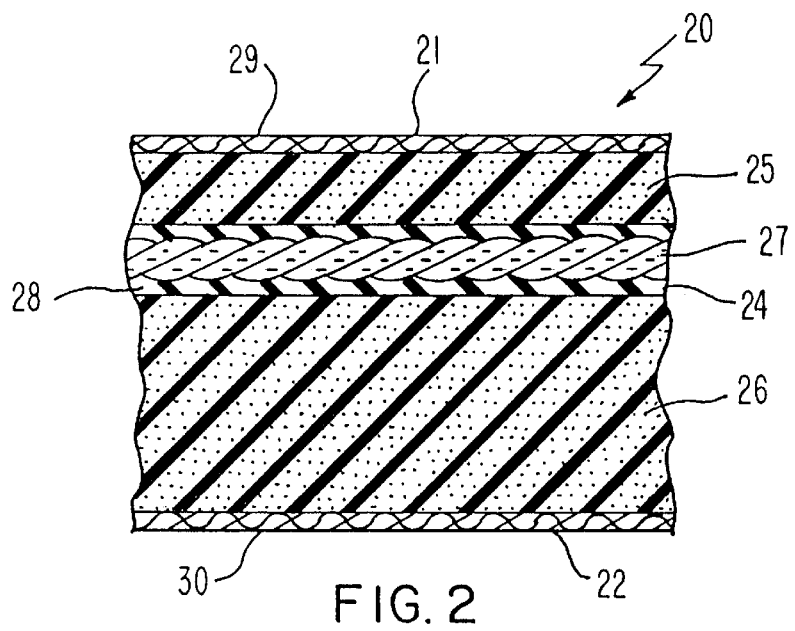
FIG. 2 is an enlarged fragmentary cross-sectional view taken on line 2—2 of FIG. 1.

Referring now to FIGS. 1 and 2, the new endless power transmission belt construction of this invention is generally indicated by the reference numeral 20 and such belt construction 20 is of trapezoidal cross-sectional outline and is popularly referred to as a V-belt, the belt construction 20 having a pair of opposed parallel sides or surfaces 21 and 22 with the surfaces 21 and 22 being connected at their opposite edges by symmetrically arranged side surfaces 23 that define the nonparallel sides of the trapezoidal cross section in a manner well known in the art.

The belt construction 20 has a load-carrying section 24 which is arranged between the outside surface 21 and the inside surface 22 of the belt construction 20, the belt construction 20 also comprising a tension section 25 and a compression section 26 with the load-carrying section 24 being disposed between the sections 25 and 26 also in a manner well known in the art.

The load carrying section 24 has as its load-carrying means a helically wound load-carrying cord 27 that has been formed according to the teachings of this invention in a manner hereinafter set forth whereby it is believed that the belt construction 20 will have improved performance characteristics.

In particular, it is believed that the cord 27 of this invention comprises an ultra-high tenacity high modulous neutral axis cord that will provide improved overall break strength of the belt construction 20, provide improved dimensional stability of the belt construction 20, provide improved cord popout for the belt construction 20, provide improved dynamic adhesion for the belt construction 20 and will cut and grind and, thus, produce a cosmetically acceptable belt construction 20 whereas the previously mentioned standard p-aramid cord will not cut or grind.

The load-carrying cord 27 is suitably embedded in a polymeric cushion 28 in a manner well known in the art whereby the load-carrying cord 27 and the cushion 28 comprises the load-carrying section 24.

The tension section 25 of the belt construction 20 has a fabric cover 29 that forms the outside surface 21 for the belt construction 20. Similarly, the compression section 26 has a fabric cover 30 thereon which defines the inside surface 22 of the belt construction 20, the covers 29 and 30 being formed of any fabric utilized in the art of making belt constructions.

Each of the sections 25 and 26 of the belt construction 20 is formed of any suitable polymeric material and each of the sections 25 and 26 has a plurality of randomly arranged fibers 31 embedded therein for a purpose well known in the art. For example, see the aforementioned to Carlson et al, U.S. Pat. No. 4,083,260 that discloses a belt construction similar to the belt construction 20 previously described whereby this U.S. patent is being incorporated into this disclosure by this reference thereto.

Figure 3:
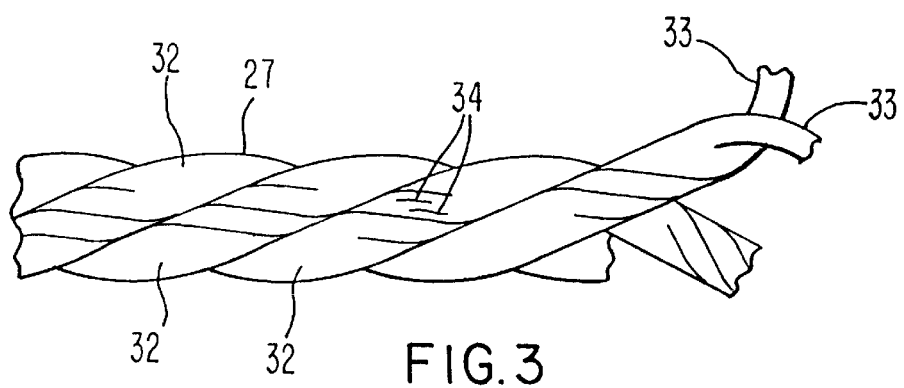
FIG. 3 is an enlarged fragmentary view of the new cord of this invention utilized as a component of the belt construction of FIGS. 1 and 2, illustrating a first embodiment.
Figure 4:
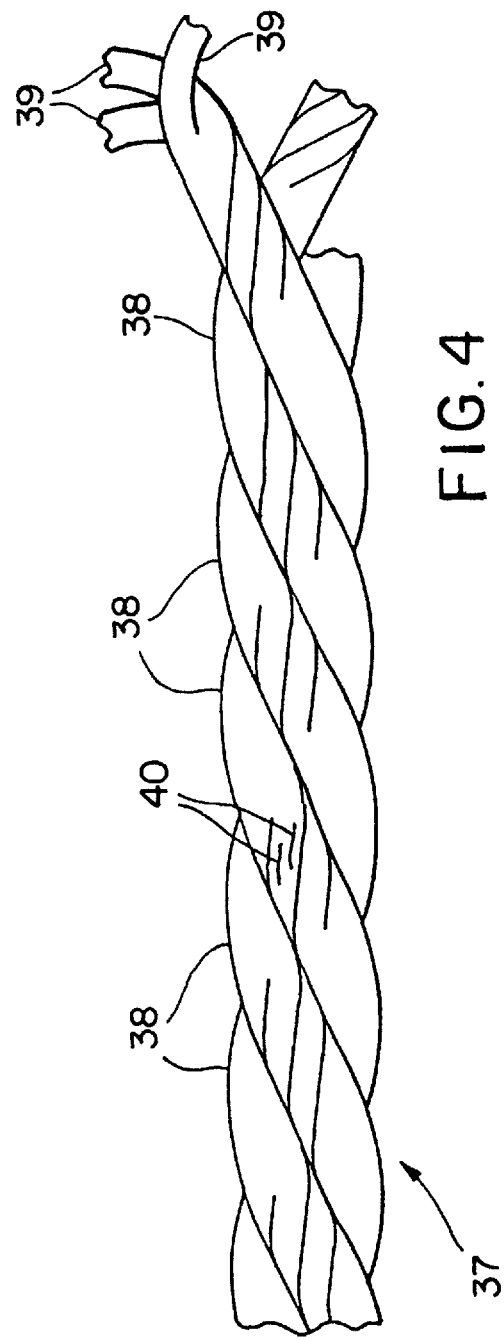
FIG. 4 is a view similar to FIG. 3 illustrating a second embodiment of the invention.

The cord 27 of this invention is best illustrated in the two embodiments of FIGS. 3 and 4. The first embodiment of FIG. 3 comprises three plies 32 twisted together in the Z direction (the spirals around the central axis slope in the same direction as the central portion of the letter Z) at a rate to approximately equal a first certain twist multiplier with each ply 32 comprising two yarns 33 of a plurality of p-aramid fiber filaments 34 having a certain denier and being twisted together in a direction opposite to the direction of the plies 32 (so as to be twisted in the S direction where in the spirals around the central axis of each yarn slope in the same direction as the middle portion of the letter S) and at a rate to approximately equal a second certain twist multiplier, each twist multiplier being equal to the quotient of the product of the turns per linear inch of the twisted material multiplied by the square root of the product of the certain denier of a yarn of the fiber filaments multiplied by the total number of the yarns being twisted at that time divided by seventy-three.

It is well known in the cord making art that material has been twisted in the S direction so as to have a S-twist if when the twisted material is held vertically, the material spirals around its longitudinal axis in the same direction as the middle portion of the letter S when the letter S is superimposed on the vertically held material. In contrast, the material has been twisted in the Z direction so as to have a Z-twist if when the twisted material is held vertically, the material spirals around its longitudinal axis in the same direction as the middle portion of the letter Z when the letter Z is superimposed on the vertically held material.

When making the aforementioned prior known standard p-aramid cord, each yarn has a denier of 1500 with each ply comprising two such yarns being twisted together in the Z direction at a rate of approximately 4.7 turns per linear inch of twisted material and with three such plies twisted together in the S direction at a rate of approximately 4.7 turns per linear inch of twisted cord whereby the resulting cord has an imbalanced twist multiplier, i.e., the fiber filaments have their longitudinal axes disposed substantially perpendicular to the longitudinal axis of the cord.

It was found according to the teachings of this invention that when utilizing a modified p-aramid material sold under the trademark TECHNORA as previously described and thereby comprising co-poly (paraphenylene/3, 4'oxydiphenylene terephthalamide) for making a cord in exactly in the same manner as the prior known standard p-aramid cord, the resulting break characteristics of such TECHNORA cord was not as good as the break characteristics of the standard p-aramid cord.

In contrast, it was found according to the teachings of this invention that when the fiber filaments of the cord 27 are made of the modified p-aramid material sold under the trademark TECHNORA with each yarn 33 thereof having a denier of approximately 1500 and with each ply 32 having the two yarns 33 twisted together in the Z direction on a 2 for 1 twister at a rate of approximately 4.9 turns per linear inch of twisted material so that the twist multiplier thereof equals 3.6765 and then having three such plies 32 twisted together in the S direction on a 2 for 1 twister at a rate of approximately 2.9 turns per linear inch of the cord so that the twist multiplier of the three plies equals 3.6765 whereby the longitudinal axes of the fiber filaments 34 are disposed generally in the longitudinal direction of the cord 27 the resulting cord 27 has improved break characteristics over the standard p-aramid cord and, thus, over the modified p-aramid cord when made in the same manner as the standard p-aramid cord.

After the cord 27 was made on the 2 for 1 twister as set forth above, the cord 27 was first dipped in a bath of PAPI (polymethylene polyphenylisocyanate) and then overcoated with a coating of RFL all in a manner well known in the art. For example, see the aforementioned to Carlson et al, U.S. Pat. No. 4,083,260.

The 2 for 1 twister comprises a ICBT machine and is well known in the art for twisting material to form cords as the like.

The aforementioned modified p-aramid material that is sold under the trademark TECHNORA for load-carrying cords is disclosed in the aforementioned to Nakjima et al, U.S. Pat. No. 5,230,667 whereby this U.S. patent is being incorporated into this application by this reference thereto.

A cord 27 made by the method of this invention as previously described was found to break when approximately 416 lbs. was applied thereto whereby the standard p-aramid cord broke at approximately 350 lbs.

It was also found that the percentage of elongation of the cord 27 of this invention was approximately 5.4% at its break point whereas the standard p-aramid cord had a 5.2% elongation at its break point.

Such a cord 27 of this invention was found to have a 1% elongation when a load of approximately 82.3 lbs. was applied thereto and had a 3% elongation when a load of 262.4 lbs. was applied thereto. In contrast, the standard p-aramid cord had a 1% elongation when a load of 56.7 lbs. was applied thereto and had a 3% elongation when a load of 194.7 lbs. was applied thereto.

Thus, it can be seen that the cord 27 of this invention has improved break characteristics over the break characteristics of the standard p-aramid cord when the cord of this invention is formed in the manner previously set forth and is twisted on a 2 for 1 twister in the manner previously set forth.

From the above it can be seen that the cord 27 of this invention shown in FIG. 3 can be described in a manner well known in the art as 1500/2/3 4.9Z×2.9S, 2 for 1 twisted modified p-aramid co-poly (paraphenylene/ 3.4'oxydiphenylene terephthalamide) with balanced T.M. (twist multiplier) and chemically treated for MRG applications, the twist multiplier for each ply being 3.6765 and the twist multiplier for the cord being 3.7687.

Another embodiment of the invention is shown in FIG. 4. Instead of a cord 27 having three plies and two yarns, a cord 37 may be utilized in the belt construction 20 as a load-carrying cord, in the same manner as described above with reference to cord 27, and for the same purposes. The cord 37 comprises five plies 38 which are twisted together in the Z direction (the spirals around the central axis slope in the same direction as the central portion of the letter Z) at a rate to approximately equal a first certain twist multiplier with each ply 38 comprising three yarns 39 of a plurality of p-aramid fiber filaments 40 having a certain denier and being twisted together in a direction opposite to the direction of the plies 38 (so as to be twisted in the S direction wherein the spirals around the central axis of each yarn slope in the same direction as the middle portion of the letter S) and at a rate to approximately equal a second certain twist multiplier, each twist multiplier being equal to the quotient of the product of the turns per linear inch of twisted material multiplied by the square root of the product of the certain denier of a yarn of the fiber filaments multiplied by the total number of the yarns being twisted at that time divided by seventy-three.

As stated above with reference to cord 27, it is known that when material has been twisted in the S direction so as to have a S-twist if when the twisted material is held vertically, the material spirals around its longitudinal axis in the same direction as the middle portion of the letter S when the letter S is superimposed on the vertically held material. In contrast, the material has been twisted in the Z direction so as to have a Z-twist if when the twisted material is held vertically, the material spirals around its longitudinal axis in the same direction as the middle portion of the letter Z when the letter Z is superimposed on the vertically held material.

When making the aforementioned prior known stanply comprising three such yarns being twisted together in the Z direction at a rate of approximately 32 turns per linear inch of twisted material and with five such plies twisted together in the S direction at a rate of approximately 3.2 turns per linear inch of twisted cord whereby the resulting cord has an imbalanced twist multiplier, i.e, the fiber filaments have their longitudinal axes disposed substantially perpendicular to the longitudinal axis of the cord.

It was found according to the teachings of this invention that when utilizing a modified p-aramid material sold under the trademark TECHNORA as previously described with reference to the cord 27, and thereby comprising copoly (paraphenylene/3,4'oxydiphenylene terephthalamide) for making a cord in exactly in the same manner as the prior known standard p-aramid cord, the resulting break characteristics of such TECHNORA cord was not as good as the break characteristics of the standard p-aramid cord.

In contrast, it was found according to the teachings of this invention that when the fiber filaments of the cord 37 are made of the said modified p-aramid material with each yarn 39 thereof having a denier of approximately 1500 and with each ply 38 having the three yarns 39 twisted together in the Z direction on a 2 for 1 twister at a rate of approximately 3.9 turns per linear inch of twisted material so that the twist multiplier thereof equals 3.5838 and then having five such plies 38 twisted together in the S direction on a 2 for 1 twister at a rate of approximately 1.8 turns per linear inch of the cord so that the twist multiplier of the three plies equals 3.6986 whereby the longitudinal axes of the fiber filaments 40 are disposed generally in the longitudinal direction of the cord 37 the resulting cord 37 has improved break characteristics over the standard p-aramid cord and, thus, over the modified p-aramid cord when made in the same manner as the standard p-aramid cord.

After the cord 37 was made on the 2 for 1 twister as set forth above, the cord 37 was first dipped in a bath of PAPI (polymethylene polyphenylisocyanate) and then overcoated with a coating of RFL all in the same manner as described above with reference to cord 27.

A cord 37 made by the method of this invention as previously described was found to break when approximately 1050 lbs. was applied thereto whereby the standard p-aramid cord broke at approximately 700 lbs. It was also found that the percentage of elongation of the cord 37 of this invention was approximately 4.1% at its break point whereas the standard p-aramid cord had a 4.2% elongation at its break point.

Such a cord 37 of this invention was found to have a 1% elongation when a load of approximately 218 lbs. was applied thereto and had a 3% elongation when a load of 755 lbs. was applied thereto. In contrast, the standard p-aramid cord had a 1% elongation when a load of 66.0 lbs. was applied thereto and had a 3% elongation when a load of 430 lbs. was applied thereto. Thus, it can be seen that the cord 37 of this invention has improved break characteristics over the break characteristics of the standard p-aramid cord when the cord of this invention is formed in the manner previously set forth and is twisted on a 2 for 1 twister in the manner previously set forth. From the above it can be seen that the cord 37 of this invention can be described in a manner well known in the art as 1500/3/5 3.9×1.8, 2 for 1 twisted modified p-aramid co-poly (paraphenylene/3.4'oxydiphenylene terephthalamide) with balanced T.M. (twist multiplier) and chemically treated for MRG applications, the twist multiplier for each ply being 3.5838 and the twist multiplier for the cord being 3.6986.

Thus, it can be seen that both embodiments of the invention not only provide a new p-aramid fiber cord for use as a component in a power transmission belt construction or the like and a new method of making the same, but also a new endless power transmission belt construction and a new method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a p-aramid fiber cord comprising five plies twisted together in one direction at a rate to approximately equal a first certain twist multiplier with each said ply comprising three yarns of a plurality of p-aramid fiber filaments having a certain denier and being twisted together in a direction opposite to said one direction at a rate to approximately equal a second certain twist multiplier, each said twist multiplier being equal to the quotient of the product of the turns per linear inch of twisted material multiplied by the square root of the product of said certain denier of said fiber filaments multiplied by the total number of said yarns being twisted at that time divided by seventy-three, the improvement wherein said yarns and said plies are respectively twisted on a 2 for 1 twister means so as to cause the longitudinal axes of said fiber filaments to be disposed generally in the longitudinal direction of said cord with said certain denier being approximately 1500, said first certain twist multiplier being 3.6986 as the five plies are twisted together at a rate of approximately 1.8 turns per linear inch of said cord, said second certain twist multiplier being 3.5838 as the three yarns for each said ply are twisted together at a rate of approximately 3.9 turns per linear inch of that said ply, and said p-aramid comprising co-poly (paraphenylene/3,4'oxydiphenylene terephthalamide).

2. A p-aramid fiber cord as set forth in claim 1 wherein said cord has been coated with material after said plies have been twisted together.

3. A p-aramid fiber cord as set forth in claim 2 wherein said material comprises polymethylene polyphenylisocyanate.

4. A p-aramid fiber cord as set forth in claim 2 wherein said material comprises RFL.

5. A p-aramid fiber cord as set forth in claim 1 wherein said cord has first been coated with a first material comprising polymethylene polyphenylisocyanate and then has been overcoated with RFL.

6. In a method of making a p-aramid fiber cord, said cord comprising five plies twisted together in one direction at a rate to approximately equal a first certain twist multiplier with each said ply comprising three yarns of a plurality of p-aramid fiber filaments having a certain denier and being twisted together in a direction opposite to said one direction at a rate to approximately equal a second certain twist multiplier, each said twist multiplier being equal to the quotient of the product of the turns per linear inch of twisted material multiplied by the square root of the product of said certain denier of said fiber filaments multiplied by the total number of said yarns being twisted at that time divided by seventy-three, the improvement comprising the step of twisting said yarns and said plies respectively on a 2 for 1 twister means so as to cause the longitudinal axes of said fiber filaments to be disposed generally in the longitudinal direction of said cord with said certain denier being approximately 1500, said first certain twist multiplier being 3.6986 as the five plies are being twisted together by said twister means at a rate of approximately 1.8 turns per linear inch of said cord, said second certain twist multiplier being 3.5838 as the three yarns for each said ply are being twisted together by said twister means at a rate of approximately 3.9 turns per linear inch of that said ply, and said p-aramid comprising co-poly (paraphenylene/3,4'oxydiphenylene terephthalamide).

7. A method of making a p-aramid fiber cord as set forth in claim 6 and comprising the step of coating said cord with material after said plies have been twisted together.

8. A method of making a p-aramid fiber cord as set forth in claim 7 wherein said material comprises polymethylene polyphenylisocyanate.

9. A method of making a p-aramid fiber cord as set forth in claim 7 wherein said material comprises RFL.

10. A method of making a p-aramid fiber cord as set forth in claim 6 and comprising the steps of first coating said cord with a first material comprising polymethylene polyphenylisocyanate, and then overcoating said cord with RFL.

11. In a construction comprising a section having a p-aramid fiber cord therein, said cord comprising five plies twisted together in one direction at a rate to approximately equal a first certain twist multiplier with each said ply comprising three yarns of a plurality of p-aramid fiber filaments having a certain denier and being twisted together in a direction opposite to said one direction at a rate to approximately equal a second certain twist multiplier, each said twist multiplier being equal to the quotient of the product of the turns per linear inch of twisted material multiplied by the square root of the product of said certain denier of said fiber filaments multiplied by the total number of said yarns being twisted at that time divided by seventy-three, the improvement wherein said yarns and said plies are respectively twisted on a 2 for 1 twister means so as to cause the longitudinal axes of said fiber filaments to be disposed generally in the longitudinal direction of said cord with said certain denier being approximately 1500, said first certain twist multiplier being 3.6986 as the five plies are twisted together at a rate of approximately 1.8 turns per linear inch of said cord, said second certain twist multiplier being 3.5838 as the three yarns for each said ply are twisted together at a rate of approximately 3.9 turns per linear inch of that said ply, and said p-aramid comprising co-poly (paraphenylene/3, 4'oxydiphenylene terephthalamide).

12. A construction as set forth in claim 11 wherein said cord has been coated with material after said plies have been twisted together.

13. A construction as set forth in claim 12 wherein said material comprises polymethylene polyphenylisocyanate.

14. A construction as set forth in claim 12 wherein said material comprises RFL.

15. A construction as set forth in claim 11 wherein said cord has first been coated with a first material comprising polymethylene polyphenylisocyanate and then has been overcoated with RFL.

16. In a method of making a construction comprising a section having a p-aramid fiber cord therein, said cord comprising five plies twisted together in one direction at a rate to approximately equal a first certain twist multiplier with each said ply comprising three yarns of a plurality of p-aramid fiber filaments having a certain denier and being twisted together in a direction opposite to said one direction at a rate to approximately equal a second certain twist multiplier, each said twist multiplier being equal to the quotient of the product of the turns per linear inch of twisted material multiplied by the square root of the product of said certain denier of said fiber filaments multiplied by the total number of said yarns being twisted at that time divided by seventy-three, the improvement comprising the step of twisting said yarns and said plies respectively on a 2 for 1 twister means so as to cause the longitudinal axes of said fiber filaments to be disposed generally in the longitudinal direction of said cord with said certain denier being approximately 1500, said first certain twist multi-plier being 3.6986 as the five plies are twisted together by said twister means at a rate of approximately 1.8 turns per linear inch of said cord, said second certain twist multiplier being 3.5838 as the two yarns for each said ply are twisted together by said twister means at a rate of approximately 3.9 turns per linear inch of that said ply, and said p-aramid comprising co-poly (paraphenylene/3,4'oxydiphenylene terephthalamide).

17. A method of making a belt construction as set forth in claim 16 and comprising the step of coating said cord with material after said plies have been twisted together.

18. A method of making a belt construction as set forth in claim 17 wherein said material comprises polymethylene polyphenylisocyanate.

19. A method of making a belt construction as set forth in claim 17 wherein said material comprises RFL.

20. A method of making a belt construction as set forth in claim 16 and comprising the steps of first coating said cord with a first material comprising polymethylene polyphenylisocyanate, and then overcoating said cord with RFL.

\* \* \* \* \*